United States Patent
Hämäläinen et al.

(10) Patent No.: US 8,121,059 B2
(45) Date of Patent: Feb. 21, 2012

(54) WIRELESS NON-CELLULAR NETWORK

(75) Inventors: Jyri Hämäläinen, Oulu (FI); Kari Horneman, Oulu (FI); Jari Hulkkonen, Oulu (FI)

(73) Assignee: Nokia Corporation, Espoo (FI)

( * ) Notice: Subject to any disclaimer, the term of this patent is extended or adjusted under 35 U.S.C. 154(b) by 992 days.

(21) Appl. No.: 11/984,286

(22) Filed: Nov. 15, 2007

(65) Prior Publication Data

US 2008/0144564 A1  Jun. 19, 2008

(30) Foreign Application Priority Data

Dec. 15, 2006  (FI) .................................... 20065810

(51) Int. Cl.
*H04L 12/56* (2006.01)
*H04J 1/16* (2006.01)
(52) U.S. Cl. ......... 370/278; 370/252; 370/328; 370/442
(58) Field of Classification Search .................. 370/252, 370/328, 278, 442
See application file for complete search history.

(56) References Cited

U.S. PATENT DOCUMENTS

| 6,108,321 | A  | * | 8/2000 | Anderson et al. ............. 370/329 |
| 8,031,650 | B2 | * | 10/2011 | Petite et al. .................... 370/320 |
| 2002/0080750 | A1 | | 6/2002 | Belcea |
| 2003/0235174 | A1 | | 12/2003 | Pichna et al. |
| 2005/0254449 | A1 | | 11/2005 | Halfmann et al. |
| 2010/0074117 | A1 | * | 3/2010 | Du et al. ....................... 370/241 |

FOREIGN PATENT DOCUMENTS

| EP | 1 638 265 A1 | 3/2006 |
| WO | WO 01/62026 A1 | 8/2001 |

OTHER PUBLICATIONS

International Search Report, PCT/FI2007/050692 filed Dec. 14, 2007.
Chinese first Office Action, dated May 25, 2011.

* cited by examiner

*Primary Examiner* — John Pezzlo
(74) *Attorney, Agent, or Firm* — Squire Sanders (US) LLP

(57) ABSTRACT

A communication method includes monitoring a time division multiple access (TDMA) frame structure of a cellular system by a plurality of non-cellular nodes of a non-cellular network by using a common channel of the cellular system, and using the time division multiple access (TDMA) frame structure of the cellular system in the non-cellular network for exchanging data between at least some of the plurality of non-cellular nodes.

37 Claims, 3 Drawing Sheets

WIRELESS NON-CELLULAR NETWORK

FIELD

The invention relates to a wireless non-cellular network, to a method, to a non-cellular node, and to a computer-readable computer distribution medium.

BACKGROUND

Wireless non-cellular networks, such as mesh networks, provide a new emerging technology with mesh routers and mesh clients. The wireless mesh networks contain low-cost, self-configuring nodes that automatically establish and maintain mesh connectivity. Examples of applications related to wireless mesh networks include: broadband home networking, community and neighborhood networking, enterprise networking, metropolitan area networking, transportation systems, building automation, health and medical systems and security surveillance systems.

Current mesh network systems rely on IEEE802.11 standard. Medium access control (MAC) of 802.11 standard applies carrier a sensing multiple access/distributed coordination function (CSMA/DCF) that is only a fully distributed mature MAC function. FIG. 1 shows an example of a wireless mesh network and a hidden node problem. The exemplary mesh network of FIG. 1 comprises mesh access points 100, 101, 102 and 103, hence referred to as mesh nodes. Mesh nodes 100 and 101 of FIG. 1 communicate with coverage/interference areas 200 and 201. Mesh node 102 is in the vicinity of mesh node 101. Packet collisions may appear if mesh nodes 100 and 102 try simultaneous communication 202, 204 with mesh node 101.

In a known method, time synchronization using a global positioning system (GPS) in mesh networks and distributed MAC applying DCF is provided. In DCF, the hidden node problem of FIG. 1 is solved through RTS/CTS (request to send/clear to send) protocol where mesh node 101 first sends an RTS to mesh node 101 that answers with a CTS (when transport medium is free). Then mesh node 102, that is coverage area of 101, can hear the CTS and knows that the medium is becoming busy.

However, it is widely acknowledged that DCF is not a spectrally efficient protocol. Time division multiple access (TDMA) is known to be more efficient access method than CSMA but its implementation in mesh networks is difficult due to various problems. Firstly, time synchronization between mesh nodes is missing. Secondly, a suitable distributed control mechanism should be found.

BRIEF DESCRIPTION OF THE INVENTION

An object of the invention is to provide an improved method, a wireless non-cellular network, a non-cellular node for a wireless non-cellular network, and a computer-readable program distribution medium.

According to an aspect of the invention, there is provided a method comprising: monitoring a time division multiple access (TDMA) frame structure of a cellular system by a plurality of non-cellular nodes of a non-cellular network by using a common channel of the cellular system; and using the time division multiple access (TDMA) frame structure of the cellular system in the wireless non-cellular network for exchanging data between at least some of the plurality of non-cellular nodes.

According to another aspect of the invention, there is provided a wireless non-cellular network comprising a plurality of non-cellular nodes, wherein at least some of the non-cellular nodes include: a receiver for monitoring a time division multiple access (TDMA) frame structure of a cellular system by using a common channel of the cellular system; and a processing unit for using the time division multiple access (TDMA) frame structure of the cellular system in the wireless non-cellular network for exchanging data with at least some of the plurality of non-cellular nodes.

According to another aspect of the invention, there is provided a non-cellular node for a wireless non-cellular network, the non-cellular node comprising: a receiver for monitoring a time division multiple access (TDMA) frame structure of a cellular system by using a common channel of the cellular system; and a processing unit for using the time division multiple access (TDMA) frame structure of the cellular system in the wireless non-cellular network for exchanging data with one or more of a plurality of non-cellular nodes of the wireless non-cellular network.

According to another aspect of the invention, there is provided a computer-readable program distribution medium encoding a computer program of instructions for executing a computer process in a wireless non-cellular network, the process comprising: monitoring a time division multiple access (TDMA) frame structure of a cellular system by a plurality of non-cellular nodes of a wireless non-cellular network by using a common channel of the cellular system; and using the time division multiple access (TDMA) frame structure of the cellular system in the wireless non-cellular network for exchanging data between at least some of the plurality of non-cellular nodes.

According to another aspect of the invention, there is provided a wireless non-cellular network comprising a plurality of non-cellular nodes, wherein at least some of the non-cellular nodes include: receiving means for monitoring a time division multiple access (TDMA) frame structure of a cellular system by using a common channel of the cellular system; and processing means for using the time division multiple access (TDMA) frame structure of the cellular system in the wireless non-cellular network for exchanging data with at least some of the plurality of non-cellular nodes.

According to another aspect of the invention, there is provided a non-cellular node for a wireless non-cellular network, the non-cellular node comprising: receiving means for monitoring a time division multiple access (TDMA) frame structure of a cellular system by using a common channel of the cellular system; and processing means for using the time division multiple access (TDMA) frame structure of the cellular system in the wireless non-cellular network for exchanging data with one or more of a plurality of non-cellular nodes of the wireless non-cellular network.

The invention provides several advantages.

Distributed TDMA communication is enabled in a non-cellular network. Spectral efficiency is improved. TDMA frame structure of a cellular system can be adopted to non-cellular communication. Synchronization is enabled also indoors. Packet collisions can be prevented because the mesh nodes near the source and destination have the knowledge of the numbers of the occupied TDMA frames.

LIST OF DRAWINGS

In the following, the invention will be described in greater detail with reference to the embodiments and the accompanying drawings, in which FIG. 1 shows an example of a wireless mesh network and a hidden node problem;

DESCRIPTION OF EMBODIMENTS

Figure 2:
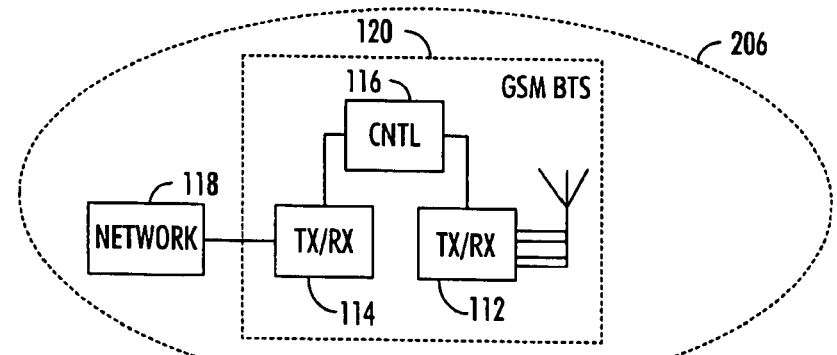
FIG. 2 illustrates another example of a wireless non-cellular network in which embodiments of the invention may be implemented.
Figure 2:
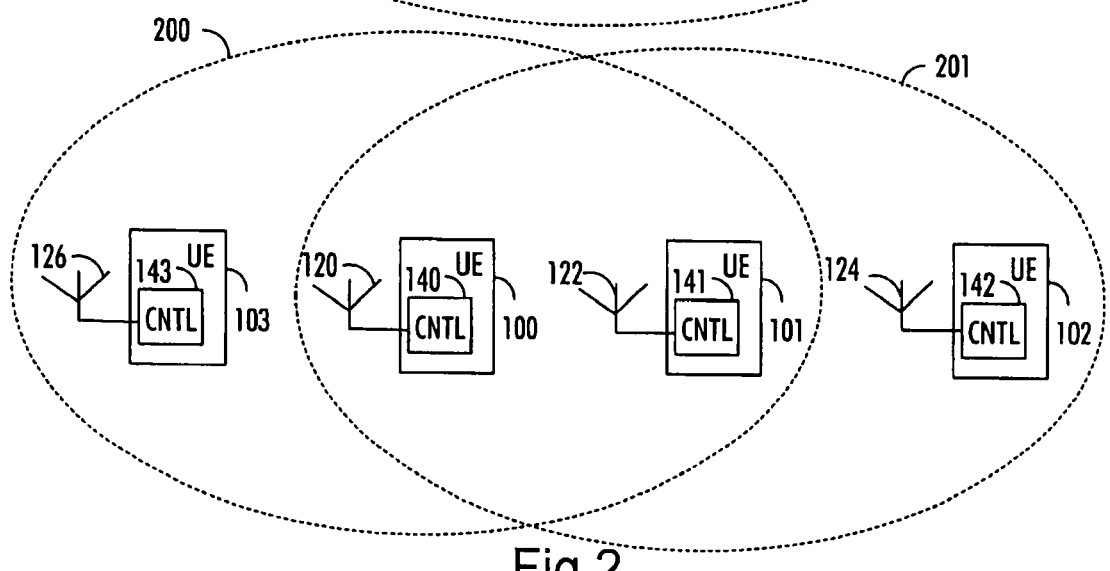

With reference to FIG. 2, let us examine an example of a wireless non-cellular network 200, 201, such as a mesh network, to which embodiments of the invention can be applied. The system comprises a plurality of non-cellular nodes 100 to 103, such as mesh nodes, each communicating data with the nearby non-cellular nodes. Hereafter, the non-cellular nodes are referred to as mesh nodes. Each mesh node 100 to 103 can be connected to several other mesh nodes. The mesh nodes 100 to 103 can be fixed or mobile terminals, for example. Data is communicated in the system via different mesh nodes such that data hops from one mesh node to another until it reaches it is destination. Each mesh node 100 to 103 is required to send data only as far as the next mesh node. Each mesh node 100 to 103 is required to inform it's routing information to every mesh node 100 to 103 it connects with. Different routing algorithms can be used for choosing the best route for communicating data via the mesh nodes.

Each mesh node 100 to 103 comprises a processing unit 140 to 143 to control functions of the devices. The processing unit 140, 141, 142, 143 handles establishment, operation and termination of radio connections in the mesh nodes 100, 101, 102, 103. The processing unit 140, 141, 142, 143 controls reception of information by controlling the processing of reception signals. The processing unit 140, 141, 142, 143 may be implemented by a digital signal processor with suitable software embedded in a computer readable medium, or by separate logic circuits, for example with ASIC (Application Specific Integrated Circuit).

Each of the mesh nodes 100, 101, 102, 103 comprises capability to transmit and receive information signals to one or more other mesh nodes. The mesh nodes 100, 101, 102, 103 comprise antenna units 120, 122, 124, 126 for transmitting and receiving signals. In the example of FIG. 2, the mesh node 103 is within coverage area 200 and the mesh node 102 is within coverage area 201. The mesh nodes 100 and 101 are within an area covering at least part of both coverage areas 200 and 201. The mesh node 100 can communicate with the mesh nodes 102 and 103. Further, the mesh node 101 can communicate with the mesh nodes 100 and 102.

In an embodiment, it is assumed that the mesh nodes 100 to 103 are able to listen to a cellular system 206, such as a GSM (global system for mobile communications) system. However, the communication between the mesh nodes is carried out by another technology. A base station 120 of a cellular system 206 may be a base transceiver station of a mobile communication system, such as UMTS (Universal Mobile Telecommunications System). The base station 120 comprises a first communication interface 112 to provide an air interface connection to the mesh nodes 100 to 103. The base station 120 may further comprise a second communication interface 114 to provide a wired connection to the network 118 of a telecommunication system. The base station 120 further comprises a processing unit 116 to control functions of the base station 120. The base station 120 may provide mesh nodes 100 to 103 with information related to transmission parameters the mesh nodes 100 to 103 should use in data transmission. The processing unit 116 may be implemented by a digital signal processor with suitable software embedded in a computer-readable medium, or by separate logic circuits, for example with ASIC.

In an embodiment, at least some of the mesh nodes 100, 101, 102, 103 comprise a cellular receiver 120, 122, 124, 126 for monitoring a time division multiple access (TDMA) frame structure of a cellular system 206 via a common channel of the cellular system, and a processing unit 140, 141, 142, 143 for using the time division multiple access (TDMA) frame structure of the cellular system 206 in the non-cellular network for exchanging data with at least some of the plurality of mesh nodes.

In an embodiment, the cellular system 206 is used by the mesh nodes for taking synchronization/timing information from the TDMA frame structure of the cellular system 206. At least part of the plurality of mesh nodes uses this information for synchronization between the mesh nodes. After the synchronization between the mesh nodes is complete, then any TDMA frame structure can be used for exchanging data between the mesh nodes. Thus, the TDMA frame structure actually used in communication between the mesh nodes does not have to be the same TDMA frame structure that is used in the cellular system.

In an embodiment, control information exchange of MAC protocol between the mesh nodes 100 to 103 is carried out in a certain frequency bandwidth using a modified DCF (distributed coordination function). Data transmission, which may contain some control information, between the mesh nodes 100 to 103 is carried out in another bandwidth by using TDMA (time division multiple access). Further, time synchronization at a frame level as well as superframe structure that are applied in the data transfer between the mesh nodes 100 to 103 may be adopted from the GSM system, for example. Also synchronization with some other cellular system can be used. The solution may operate in a license exempt or regulated band.

In an embodiment, each mesh node 100 to 103 comprises a processing unit 140, 141, 142, 143 for synchronizing with a time division multiple access (TDMA) frame structure of a cellular system via a synchronization channel. The mesh nodes 100 to 103 further comprise a monitoring unit 140, 141, 142, 143 for monitoring occupied TDMA frames in the non-cellular network. The mesh nodes 100, 101, 102, 103 further comprise transmission units 120, 122, 124, 126 for transmitting control messages to other mesh nodes in the non-cellular network. Thus, cellular transmitters are not required in the mesh nodes.

Let us next assume that the mesh node 100 is to transmit data to the mesh node 101. From now on the mesh node 100 is referred to as a source mesh node 100, and the mesh node 101 is referred to as a destination mesh node 101. In an embodiment, the transmission unit 120 of the source mesh node 100 is configured to transmit a control message from the source mesh node 100 to the destination mesh node 102 for requesting approval of one or more TDMA frames.

The processing unit 141 of the source mesh node 101 is configured to approve the requested one or more TDMA frames when the one or more TDMA frames are available within the coverage area 201 of the destination mesh node 101. If the requested TDMA frames are approved, the processing unit of the source mesh node 100 controls transmission of packet data to the destination mesh node 101 in the approved one or more TDMA frames.

In an embodiment, the control messages between the source mesh node 100 and the destination mesh node 101 are exchanged by using a distributed control function (DCF).

In an embodiment, one or more numbers of the requested TDMA frames are transmitted within a request-to-send message from the source mesh node 100 to the destination mesh node 101, and the requested one or more TDMA frames are approved by transmitting a clear-to-send message from the destination mesh node 101 to the source mesh node 100.

In an embodiment, the clear-to-send message includes the numbers of the TDMA frames included in the request-to-send message.

In an embodiment, transmitting of the clear-to-send message is suspended when the requested TDMA frames are occupied within the coverage area 201 of the destination mesh node 101.

In an embodiment, the request-to-send message is retransmitted from the source mesh node 100 to the destination mesh node 101 when a clear-to-send message has not been received during a predetermined period of time.

In an embodiment, a new request-to-send message with new TDMA frame numbers is transmitted from the source mesh node 100 to the destination mesh node 101 when a clear-to-send message has not been received during a predetermined period of time.

In an embodiment, the DFC is modified such that a frame number(s) from a cellular (e.g. GSM) system is included in the request-to-send message (RTS) of the source mesh node 100 to be accepted by the destination mesh node 101 with a clear-to-send message (CTS). If the destination mesh node 101 does not accept the suggested frame number(s), then the destination mesh node 101 does not send the clear-to-send message. This may happen when the suggested frame(s) is already used in other transmissions, e.g. by a nearby mesh node 102 of the destination mesh node 101.

In an embodiment, MAC protocol packet collisions can be prevented since all the mesh nodes near the source mesh node 100 and the destination mesh node 101 know the numbers of occupied TDMA frames. Further, suitable time reference for TDMA is enabled by synchronization with the GSM TDMA frame structure.

Figure 1:
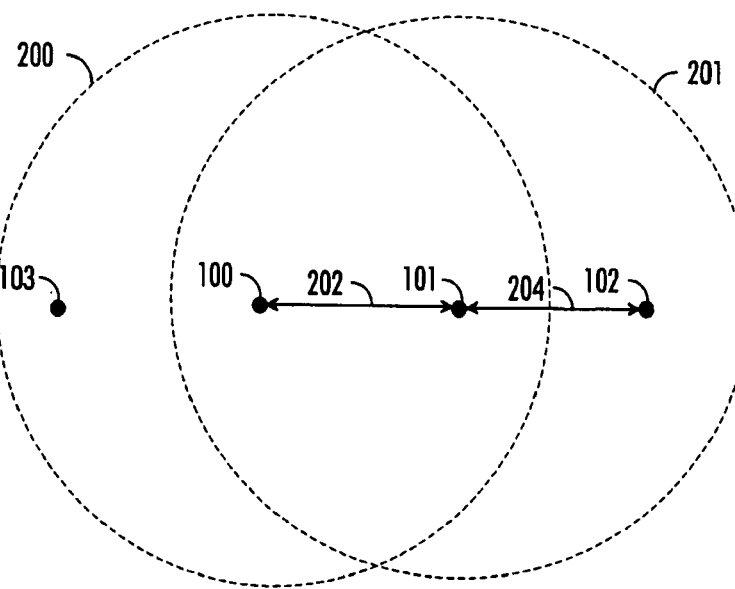
Figure 3:
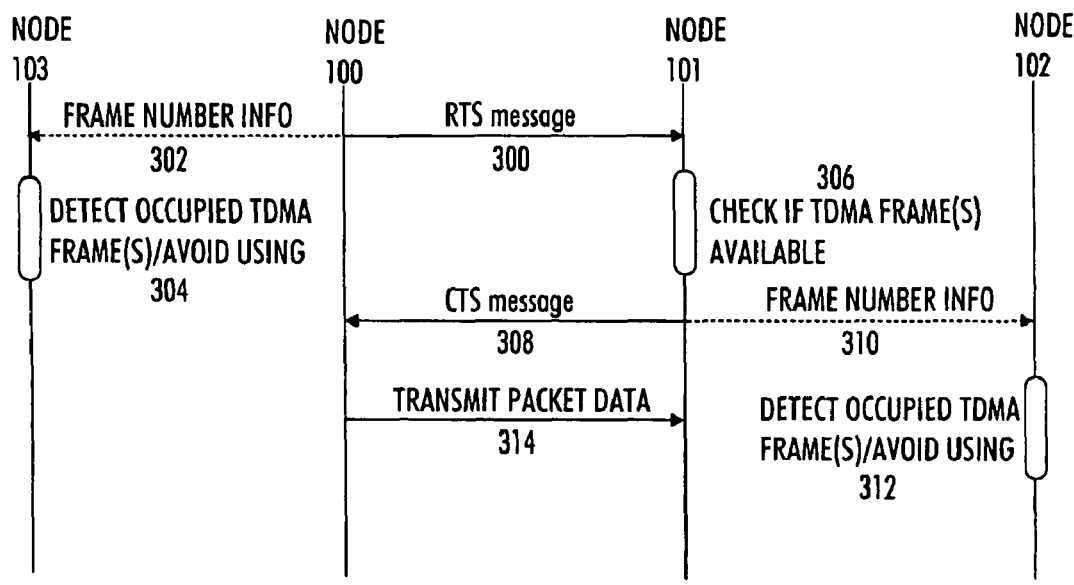
FIG. 3 illustrates a signaling diagram in a wireless mesh network according to an embodiment of the invention.

FIG. 3 illustrates a signaling diagram in a wireless non-cellular network, such as a mesh network, according to an embodiment of the invention. The mesh node numbering refers to the situation of FIGS. 1 and 2. After synchronization a mesh node 100, 101, 102, 103 can communicate with other mesh nodes 100, 101, 102, 103. Let us assume that the mesh nodes 100 and 101 are synchronized, and a source mesh node 100 wishes to send data to a destination mesh node 101.

In 300, the source mesh node 100 sends a request-to-send message in control frequency to the destination mesh node 101 for requesting approval of one or more TDMA frames. The request-to-send message comprises the proposed TDMA frame numbers. In 302, a mesh node 103 monitors the TDMA frame number information by monitoring the signals. In 304, the mesh node 103 has detected that the proposed TDMA frames may become occupied and, thus avoids using them.

In 306, the destination mesh node 101 has received the request-to-send message and checks if the proposed TDMA frames are available. In 308, the destination mesh node 101 transmits an approval of the requested one or more TDMA frames in the form of a clear-to-send message to the source mesh node 100 when the one or more TDMA frames are available within the coverage area of the destination mesh node 101. In 310, a mesh node 102 monitors the TDMA frame number information by monitoring the signals, and in 312, the mesh node 102 detects the occupied TDMA frames and avoids using them.

When the source mesh node 100 has received the clear-to-send message from the destination mesh node 101, the source mesh node 100 starts transmitting packet data to the destination mesh node 101 in 314.

Figure 4:
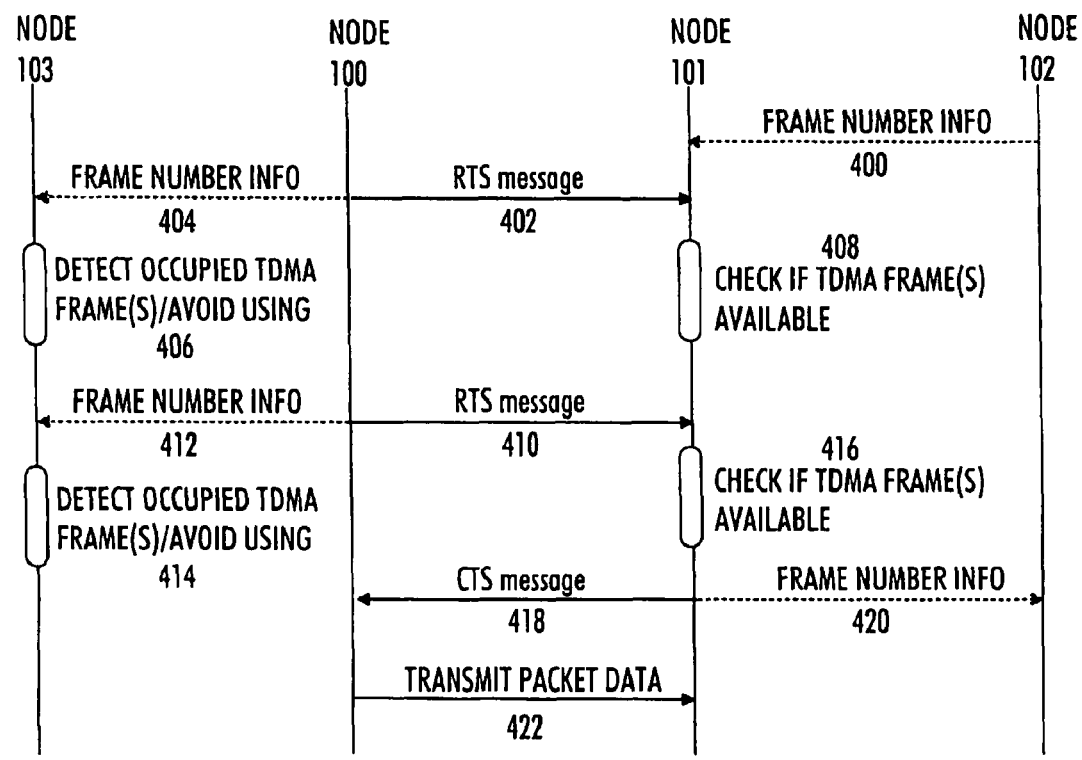
FIG. 4 illustrates a signaling diagram in a wireless mesh network according to an embodiment of the invention.

FIG. 4 illustrates a signaling diagram in a wireless mesh network according to an embodiment of the invention. The mesh node numbering refers to the situation of FIGS. 1 and 2. In the example of FIG. 4, there is conflict where the proposed TDMA frames are already reserved since mesh node 102 is using some or all of the proposed frames for reception/transmission.

As in FIG. 3, also in FIG. 4, after synchronization a mesh node 100, 101, 102, 103 can communicate with other mesh nodes 100, 101, 102, 103. The mesh nodes 100 and 101 are synchronized, and the source mesh node 100 wishes to send data to a destination mesh node 101.

In 400, the destination mesh node 101 monitors TDMA frame information from another mesh node 102 within the coverage area of the destination mesh node 101. The destination mesh node 101 now knows to avoid using the TDMA frames that were included in the monitored information.

In 402, the source mesh node 100 sends a request-to-send message in control frequency to the destination mesh node 101 for requesting approval of one or more TDMA frames. The request-to-send message comprises the proposed TDMA frame numbers. In 404, a mesh node 103 monitors the TDMA frame number information by monitoring the signals. In 406, the mesh node 103 has detected that the proposed TDMA frames may become occupied and, thus avoids using them.

In 408, the destination mesh node 101 has received the request-to-send message from the source mesh node 100 but since the proposed TDMA frames are already reserved by the mesh node 102, the destination mesh node 101 does not send a clear-to-send message to the source node 100.

After a predetermined period of time, the source mesh node 100 retransmits a request-to-send message to the destination mesh node 101 in 410. The request-to-send message may propose the same TDMA frame numbers than in the previous request-to-send message or new TDMA frame numbers. Again, the mesh node 103 monitors the TDMA frame number information by monitoring the signals in 412. In 414, the mesh node 103 has detected that the proposed TDMA frames may become occupied and, thus avoids using them.

In 416, the destination mesh node 101 detects that the proposed TDMA frames are now available, and sends a clear-to-send message to the source mesh node 100 in 418. The mesh node 102 monitors the signaling in 420, and knows to avoid using the proposed TDMA frames. In 314, the source mesh node 100 transmits packet data to the destination mesh node 101 in the accepted TDMA frames.

Figure 5:
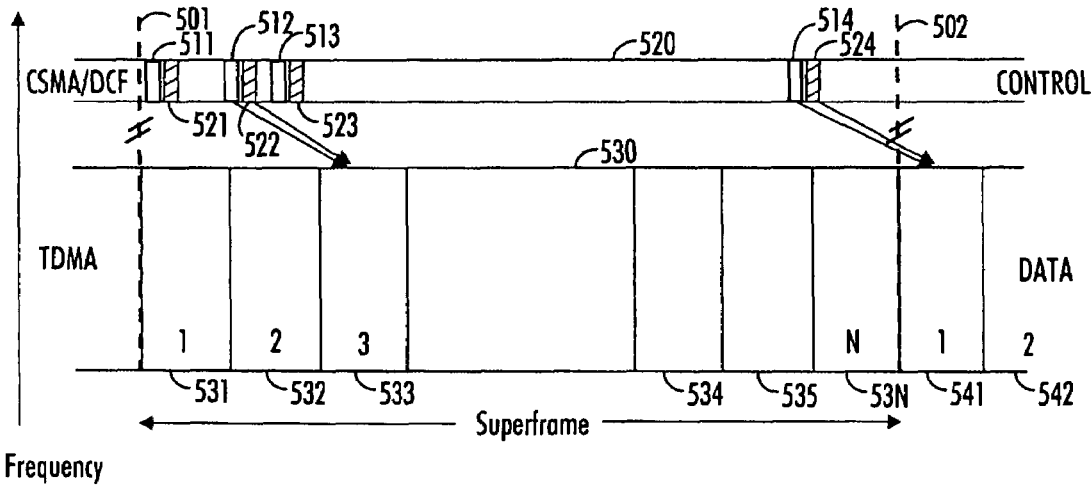
FIG. 5 illustrates a superframe/access structure for use in a wireless mesh network according to an embodiment of the invention.

FIG. 5 illustrates a superframe/access structure for use in a wireless non-cellular network according to an embodiment of the invention. Control information is exchanged in a bandwidth 520 using the modified DCF. Data transmission is carried out in another bandwidth 530 using TDMA. The modified DCF comprises proposed TDMA frame number(s) included in the RTS messages 511 to 514 and approval of the proposed TDMA frame number(s) in the form of the CTS messages 521 to 542. If proposed frames are not in use, then CTS message containing the frame number(s) originally proposed can be sent to the requesting mesh node (source mesh node). Data packet is sent in the agreed TDMA frame(s). If the proposed TDMA frame(s) is in use, then CTS transmission is suspended. After a predetermined period of time, a new RTS message can be transmitted.

Time synchronization at a frame level and a superframe structure may be adopted from the GSM system. The benefit obtained from using a GSM TDMA structure for synchronization is twofold. First, GSM common channels, such as synchronization channels (SCH), usually admit both outdoor and indoor coverage, and more importantly, fixed frame boundaries defined via GSM common channels, such as SCH, are provided. SCH can be transmitted e.g. 5 times (each 10 TDMA frame) during a common channel multiframe. One common channel multiframe comprises 51 TDMA frames, i.e. 235 ms. SCH contains a TDMA frame number as well as a base station identity code (BSIC). While initializing and maintaining the connection to other nodes, a mesh node monitors the GSM TDMA frame structure, e.g. via SCH, in order to find superframe boundaries, denoted by 501 and 502 in FIG. 5. Note that a GSM transmitter is not needed in the mesh nodes. Any multiple of GSM TDMA frame period (4.615 ms) other than the ones used in these examples can be used to define superframe boundaries. The TDMA structure is thus borrowed from another system where it is already available by only listening to the other system.

The length of the TDMA frames within the superframes can be defined according to the underlying cellular system taking into account the accuracy requirements of the synchronization. In an embodiment, one control bandwidth can be assigned with more than one data frequencies.

In an embodiment, the mesh nodes can monitor more than one GSM base station synchronization channel, especially when located in cell border areas. This problem can be overcome by using the base station identity code (BSIC) such that it is decided with which BSIC the synchronization is carried out. A GSM macro base station coverage area is typically kilometers, and thus the mesh nodes are usually located under a certain GSM base station coverage area. Also suitable guard periods between TDMA frames can be used. Further, the lowest frequency variant of GSM can be used if different variants are used in the same area. In case of a conflict in timing between the mesh nodes, a conventional DCF may be used. For that purpose, some data channels may be preserved for DCF usage.

Figure 6:
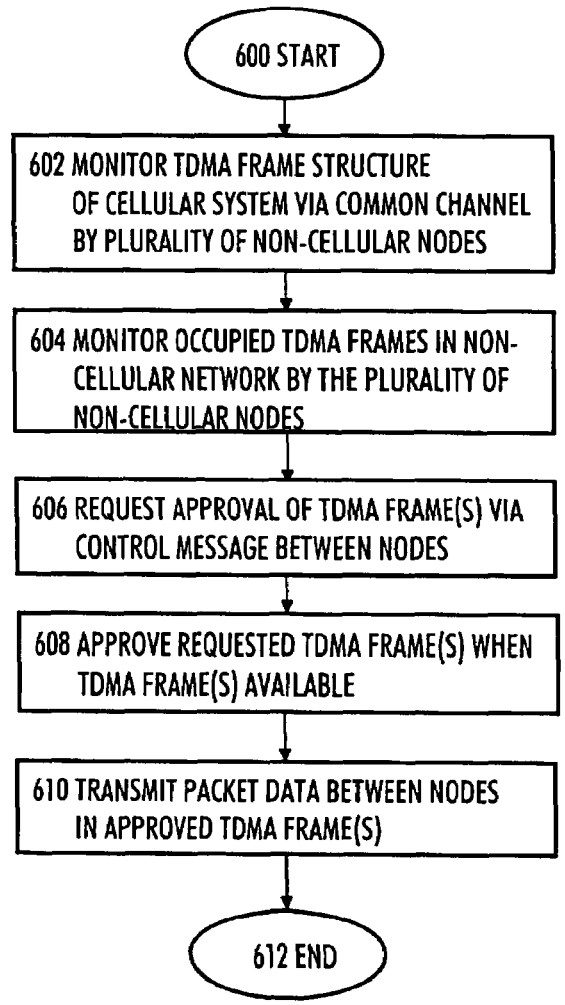
FIG. 6 illustrates a flow diagram of a communication method according to an embodiment of the invention.

FIG. 6 illustrates a flow diagram of a method according to an embodiment of the invention. The method starts in 600. In 602, a plurality of non-cellular nodes of a wireless non-cellular network monitor a time division multiple access (TDMA) frame structure of a cellular system via a common channel of the cellular system. In 604, occupied TDMA frames in the non-cellular network are monitored by the plurality of non-cellular nodes. In 606, an approval of one or more TDMA frames is requested by a control message from a source non-cellular node to a destination non-cellular node. In 608, the requested one or more TDMA frames are approved when the one or more TDMA frames are available within the coverage area of the destination non-cellular node. In 610, packet data is transmitted to the destination non-cellular node in the approved one or more TDMA frames. The method ends in 612.

The embodiments of the invention may be realized in a non-cellular node entity, comprising a controller. The controller may be configured to perform at least some of the steps described in connection with the flow-chart of FIG. 6 and in connection with FIGS. 3 and 4. The embodiments may be implemented as a computer program comprising instructions for executing a computer process for communicating.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method comprising:
monitoring a time division multiple access frame structure of a cellular system by a plurality of non-cellular nodes of a non-cellular network by using a common channel of the cellular system;
monitoring occupied time division multiple access frames in the non-cellular network by the plurality of non-cellular nodes;
requesting approval of data transmission by a control message in the non-cellular system from a source non-cellular node to a destination non-cellular node using information from the time division multiple access frame structure of the cellular system; and
using the information from the time division multiple access frame structure of the cellular system in the non-cellular network for directly exchanging data between the plurality of non-cellular nodes only in the non-cellular network.

2. The method of claim 1, further comprising:
exchanging control information of a medium access control protocol in a first frequency bandwidth by at least one of the plurality of non-cellular nodes of the non-cellular network; and
transmitting data in a second frequency bandwidth by using a time division multiple access frame structure.

3. The method of claim 1, further comprising: exchanging control messages between a source non-cellular node and a destination non-cellular node by using a distributed coordination function.

4. The method of claim 1, further comprising:
synchronizing with the time division multiple access frame structure of the cellular system via a synchronization channel by the at least part of the plurality of non-cellular nodes of the non-cellular network.

5. The method of claim 1, further comprising:
approving the requested one or more time division multiple access frames when the one or more time division multiple access frames are available within the coverage area of the destination non-cellular node; and
transmitting packet data to the destination non-cellular node in the approved one or more time division multiple access frames.

6. The method of claim 5, further comprising: transmitting one or more numbers of the requested time division multiple access frames within a request-to-send message from the source non-cellular node to the destination non-cellular node, and approving the requested one or more time division multiple access frames by transmitting a clear-to-send message from the destination non-cellular node to the source non-cellular node.

7. The method of claim 6, wherein the clear-to-send message includes the numbers of the time division multiple access frames included in the request-to-send message.

8. The method of claim 6, further comprising: suspending transmitting of the clear-to-send message when the requested time division multiple access frames are occupied within the coverage area of the destination non-cellular node.

9. The method of claim 6, further comprising: retransmitting the request-to-send message from the source non-cellular node to the destination non-cellular node when a clear-to-send message has not been received during a predetermined period of time.

10. The method of claim 6, further comprising: transmitting a new request-to-send message with new time division multiple access frame numbers from the source non-cellular node to the destination non-cellular node when a clear-to-send message has not been received during a predetermined period of time.

11. A wireless non-cellular network, comprising:
a plurality of non-cellular nodes, wherein at least one of the non-cellular nodes comprises
a receiver configured to monitor a time division multiple access frame structure of a cellular system by using a common channel of the cellular system; and
a processing unit configured to
monitor occupied time division multiple access frames in the non-cellular network by the plurality of non-cellular nodes,
request approval of data transmission by a control message in the non-cellular system from a source non-cellular node to a destination non-cellular node using information from the time division multiple access frame structure of the cellular system, and
use the information from the time division multiple access frame structure of the cellular system in the wireless non-cellular network to directly exchange data with at least one of the plurality of non-cellular nodes only in the non-cellular network.

12. The network of claim 11, wherein at least one of the non-cellular nodes further comprises:
a processing unit configured to exchange control information of a medium access control protocol in a first frequency bandwidth with at least one of the plurality of non-cellular nodes of the wireless non-cellular network; and
a transmission unit configured to transmit data in a second frequency bandwidth by using a time division multiple access frame structure.

13. The network of claim 11, wherein at least one of the non-cellular nodes further comprises a processing unit configured to exchange control messages between a source non-cellular node and a destination non-cellular node by using a distributed coordination function.

14. The network of claim 11, wherein at least one of the non-cellular nodes further comprises: a processing unit configured to synchronize with the time division multiple access frame structure of the cellular system via a synchronization channel.

15. The network of claim 11, wherein:
the processing unit is configured to approve the requested one or more time division multiple access frames when the one or more time division multiple access frames are available within the coverage area of the destination non-cellular node; and
a transmission unit configured to transmit packet data to the destination non-cellular node in the approved one or more time division multiple access frames.

16. The network of claim 15, wherein the processing unit is configured to transmit one or more numbers of the requested time division multiple access frames within a request-to-send message from the source non-cellular node to the destination non-cellular node, and the processing unit is configured to approve the requested one or more time division multiple access frames by transmitting a clear-to-send message from the destination non-cellular node to the source non-cellular node.

17. The network of claim 16, wherein the clear-to-send message includes the numbers of the time division multiple access frames included in the request-to-send message.

18. The network of claim 16, wherein the processing unit is configured to suspend transmitting the clear-to-send message when the requested time division multiple access frames are occupied within the coverage area of the destination non-cellular node.

19. The network of claim 16, wherein the processing unit is configured to retransmit the request-to-send message from the source non-cellular node to the destination non-cellular node when a clear-to-send message has not been received during a predetermined period of time.

20. The network of claim 16, wherein the processing unit is configured to transmit a new request-to-send message with new time division multiple access frame numbers from the source non-cellular node to the destination non-cellular node when a clear-to-send message has not been received during a predetermined period of time.

21. An apparatus, comprising:
at least one processor; and
at least one memory including computer program code,
the at least one memory and the computer program code configured, with the at least one processor, to cause the apparatus at least to
monitor a time division multiple access frame structure of a cellular system by using a common channel of the cellular system,
monitor occupied time division multiple access frames in the non-cellular network by the plurality of non-cellular nodes,
request approval of data transmission by a control message in the non-cellular system from a source non-cellular node to a destination non-cellular node using information from the time division multiple access frame structure of the cellular system, and
use the information from the time division multiple access frame structure of the cellular system in a wireless non-cellular network to directly exchange data with at least one of a plurality of non-cellular nodes of the wireless non-cellular network only in the non-cellular network.

22. The apparatus of claim 21, wherein:
the at least one memory and the computer program code are further configured, with the at least one processor, to cause the apparatus at least to
exchange control information of a medium access control protocol in a first frequency bandwidth with at least one of the plurality of non-cellular nodes of the wireless non-cellular network, and
transmit data in a second frequency bandwidth by using a time division multiple access frame structure.

23. The apparatus of claim 21, wherein:
the at least one memory and the computer program code are further configured, with the at least one processor, to cause the apparatus at least to
exchange control messages with a destination non-cellular node by using a distributed coordination function.

24. The apparatus of claim 21, wherein:
the at least one memory and the computer program code are further configured, with the at least one processor, to cause the apparatus at least to
synchronize to the time division multiple access frame structure of the cellular system via a synchronization channel.

25. The apparatus of claim 21, wherein:
the at least one memory and the computer program code are further configured, with the at least one processor, to cause the apparatus at least to
receive an approval of the requested one or more time division multiple access frames from the destination non-cellular node; and
transmit packet data to the destination non-cellular node in the approved one or more time division multiple access frames.

26. The apparatus of claim 25, wherein the at least one memory and the computer program code are further configured, with the at least one processor, to cause the apparatus at least to transmit one or more numbers of the requested time division multiple access frames within a request-to-send message to the destination non-cellular node, and to receive the approval of the requested one or more time division multiple access frames by receiving a clear-to-send message from the destination non-cellular node.

27. The apparatus of claim 26, wherein the at least one memory and the computer program code are further configured, with the at least one processor, to cause the apparatus at least to retransmit the request-to-send message to the destination non-cellular node when a clear-to-send message has not been received during a predetermined period of time.

28. The apparatus of claim 26, wherein the at least one memory and the computer program code are further configured, with the at least one processor, to cause the apparatus at least to transmit a new request-to-send message with new time division multiple access frame numbers to the destination non-cellular node when a clear-to-send message has not been received during a predetermined period of time.

29. The apparatus of claim 21, wherein:
the at least one memory and the computer program code are further configured, with the at least one processor, to cause the apparatus at least to
receive a control message from a source non-cellular node for requesting approval of one or more time division multiple access frames;
transmit an approval of the requested one or more time division multiple access frames to the source non-cellular node when the one or more time division multiple access frames are available within the coverage area of the non-cellular node, and
receive packet data from the source non-cellular node in the approved one or more time division multiple access frames.

30. The apparatus of claim 29, wherein the at least one memory and the computer program code are further configured, with the at least one processor, to cause the apparatus at least to receive one or more numbers of the requested time division multiple access frames within a request-to-send message from the source non-cellular node, and to approve the requested one or more time division multiple access frames by transmitting a clear-to-send message to the source non-cellular node.

31. The apparatus of claim 30, wherein the at least one memory and the computer program code are further configured, with the at least one processor, to cause the apparatus at least to suspend transmitting the clear-to-send message when the requested time division multiple access frames are occupied within the coverage area of the non-cellular node.

32. A non-transitory computer-readable program distribution medium encoding a computer program of instructions for executing a computer process in a wireless non-cellular network, the process comprising:
monitoring a time division multiple access frame structure of a cellular system by a plurality of non-cellular nodes of a wireless non-cellular network by using a common channel of the cellular system;
monitoring occupied time division multiple access frames in the non-cellular network by the plurality of non-cellular nodes;
requesting approval of data transmission by a control message in the non-cellular system from a source non-cellular node to a destination non-cellular node using information from the time division multiple access frame structure of the cellular system; and
using the information from the time division multiple access frame structure of the cellular system in the wireless non-cellular network for directly exchanging data between the plurality of non-cellular nodes only in the non-cellular network.

33. The non-transitory computer-readable program distribution medium of claim 32, the distribution medium including at least one of the following media: a computer readable medium, a program storage medium, a record medium, a computer readable memory, a computer readable software distribution package, and a computer readable compressed software package.

34. A wireless non-cellular network comprising a plurality of non-cellular nodes, wherein at least one of the non-cellular nodes comprises:
receiving means for monitoring a time division multiple access frame structure of a cellular system by using a common channel of the cellular system;
monitoring means for monitoring occupied time division multiple access frames in the non-cellular network by the plurality of non-cellular nodes;
requesting means for requesting approval of data transmission by a control message in the non-cellular system from a source non-cellular node to a destination non-cellular node using information from the time division multiple access frame structure of the cellular system; and
processing means for using the information from the time division multiple access frame structure of the cellular system in the wireless non-cellular network for directly exchanging data with at least one of the plurality of non-cellular nodes only in the non-cellular network.

35. The network of claim 34, wherein at least one of the non-cellular nodes further comprises:
processing means for exchanging control information of a medium access control protocol in a first frequency bandwidth with at least one of the plurality of non-cellular nodes of the wireless non-cellular network; and
transmitting means for transmitting data in a second frequency bandwidth by using a time division multiple access frame structure.

36. An apparatus, comprising:
receiving means for monitoring a time division multiple access frame structure of a cellular system by using a common channel of the cellular system;
monitoring means for monitoring occupied time division multiple access frames in the non-cellular network by the plurality of non-cellular nodes;
requesting means for requesting approval of data transmission by a control message in the non-cellular system from a source non-cellular node to a destination non-cellular node using information from the time division multiple access frame structure of the cellular system; and
processing means for using the information from the time division multiple access frame structure of the cellular system in a wireless non-cellular network for directly exchanging data with at least one of a plurality of non-cellular nodes of the wireless non-cellular network only in the non-cellular network.

37. The apparatus of claim 36, further comprising:
processing means for exchanging control information of a medium access control protocol in a first frequency bandwidth with at least one of the plurality of non-cellular nodes of the wireless non-cellular network; and
transmitting means for transmitting data in a second frequency bandwidth by using the time division multiple access frame structure.

* * * * *